(12) United States Patent
Shanjani

(10) Patent No.: US 11,070,243 B2
(45) Date of Patent: Jul. 20, 2021

(54) METHOD AND APPARATUS FOR SWITCHING OF SHUNT AND THROUGH SWITCHES OF A TRANSCEIVER

(71) Applicant: pSemi Corporation, San Diego, CA (US)

(72) Inventor: Payman Shanjani, San Diego, CA (US)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/878,262

(22) Filed: May 19, 2020

(65) Prior Publication Data

US 2020/0350947 A1 Nov. 5, 2020

Related U.S. Application Data

(63) Continuation of application No. 16/352,647, filed on Mar. 13, 2019, now Pat. No. 10,686,484, which is a continuation of application No. 15/612,941, filed on Jun. 2, 2017, now Pat. No. 10,277,268.

(51) Int. Cl.
| | |
|---|---|
| *H04B 1/44* | (2006.01) |
| *H04B 1/16* | (2006.01) |
| *H04B 1/403* | (2015.01) |
| *H02M 1/00* | (2006.01) |

(52) U.S. Cl.
CPC ............ *H04B 1/44* (2013.01); *H04B 1/1615* (2013.01); *H04B 1/406* (2013.01); *H02M 2001/0045* (2013.01)

(58) Field of Classification Search
CPC ...... H04B 1/44; H04B 1/16165; H04B 1/406; H02M 2001/0045
USPC ............................................. 455/83
See application file for complete search history.

(56) References Cited

U.S. PATENT DOCUMENTS

| | | | | | |
|---|---|---|---|---|---|
| 2,156,959 | A | * | 5/1939 | Bedford ............... | H02M 1/045 363/119 |
| 3,652,914 | A | * | 3/1972 | Krausser ............... | G11C 11/403 320/166 |
| 3,699,522 | A | * | 10/1972 | Haner, Jr. ............ | B61L 3/127 340/9.12 |

(Continued)

OTHER PUBLICATIONS

Nguyen, et al., Notice of Allowance received from the USPTO dated Jan. 8, 2019 for U.S. Appl. No. 15/612,941, 19 pgs.

(Continued)

*Primary Examiner* — Hai V Nguyen
(74) *Attorney, Agent, or Firm* — Jaquez Land Greenhaus & McFarland LLP; John Land, Esq.

(57) ABSTRACT

A switching network and associated method for operating within a transceiver are disclosed. The switching network has a timing control circuit that offsets the time at which a through switch and a shunt switch transition between on and off states. The output of the timing control circuit is an inverted and delayed version of a control signal applied to the input of the timing control circuit. Controlling the timing of the shunt switch provides a means to safely discharge any accumulated charge within the capacitance $C_{gs}$ between the gate and source of transistors included within the through switch.

16 Claims, 8 Drawing Sheets

(56) References Cited

U.S. PATENT DOCUMENTS

| | | | | |
|---|---|---|---|---|
| 3,761,610 A * | 9/1973 | Krallinger | H04N 1/41 | 358/438 |
| 3,975,688 A * | 8/1976 | Kroger | H04W 52/0241 | 348/730 |
| 4,164,785 A * | 8/1979 | Young | H02M 5/32 | 318/158 |
| 4,190,836 A * | 2/1980 | Kimura | H05B 45/36 | 345/46 |
| 4,450,336 A * | 5/1984 | Inoue | B23H 1/022 | 219/69.16 |
| 4,525,863 A * | 6/1985 | Stites | H04B 1/48 | 455/83 |
| 4,614,962 A * | 9/1986 | Bertotti | H01L 29/7428 | 257/154 |
| 4,933,798 A * | 6/1990 | Widmayer | H02M 5/293 | 315/248 |
| 5,073,972 A * | 12/1991 | Tendler | H04B 1/3877 | 340/7.5 |
| 5,163,158 A * | 11/1992 | Tendler | H04B 1/3877 | 340/7.29 |
| 5,483,188 A * | 1/1996 | Frodsham | H03K 5/01 | 327/108 |
| 5,558,071 A * | 9/1996 | Ward | F02P 3/02 | 123/598 |
| 5,613,077 A * | 3/1997 | Leung | G06F 11/10 | 257/E21.526 |
| 5,640,048 A * | 6/1997 | Selna | H01L 23/3128 | 257/738 |
| 5,666,480 A * | 9/1997 | Leung | G06F 11/10 | 257/E21.526 |
| 5,741,729 A * | 4/1998 | Selna | H01L 23/3128 | 438/125 |
| 5,825,164 A * | 10/1998 | Williams | H02P 13/06 | 323/255 |
| 5,898,911 A * | 4/1999 | White | H04W 52/0212 | 455/232.1 |
| 5,977,840 A * | 11/1999 | Connell | H03L 3/00 | 331/158 |
| 6,268,989 B1 * | 7/2001 | Dougherty | H02H 1/0015 | 361/115 |
| 6,281,604 B1 * | 8/2001 | Koh | H05B 39/08 | 307/112 |
| 6,518,568 B1 * | 2/2003 | Kovtoun | H01J 49/40 | 250/287 |
| 6,657,458 B1 * | 12/2003 | Sharpe-Geisler | H03K 19/018585 | 326/37 |
| 6,714,043 B1 * | 3/2004 | Sharpe-Geisler | H03K 19/018585 | 326/37 |
| 6,714,048 B1 * | 3/2004 | Sharpe-Geisler | H03K 19/018585 | 326/37 |
| 6,720,755 B1 * | 4/2004 | Sharpe-Geisler | G05F 3/30 | 323/314 |
| 6,760,209 B1 * | 7/2004 | Sharpe-Geisler | H01L 27/0255 | 361/111 |
| 6,798,244 B1 * | 9/2004 | Sharpe-Geisler | H03K 17/163 | 326/121 |
| 6,870,391 B1 * | 3/2005 | Sharpe-Geisler | H03K 19/018585 | 326/37 |
| 6,957,047 B1 * | 10/2005 | Young | H04B 1/18 | 455/115.1 |
| 7,147,978 B2 * | 12/2006 | Zhu | G03G 5/14769 | 430/66 |
| 7,248,115 B2 * | 7/2007 | Nishimura | H03F 3/72 | 330/253 |
| 7,283,793 B1 * | 10/2007 | McKay | H04B 1/0458 | 333/103 |
| 7,546,089 B2 * | 6/2009 | Bellantoni | H01P 5/04 | 333/101 |
| 7,626,884 B2 * | 12/2009 | Cox | G11C 7/1045 | 365/191 |
| 7,643,322 B1 * | 1/2010 | Varga | H02M 3/156 | 363/97 |
| 7,746,123 B2 * | 6/2010 | Hester | H03K 17/164 | 327/108 |
| 7,778,064 B2 * | 8/2010 | Parkinson | G11C 13/004 | 365/148 |
| 7,937,058 B2 * | 5/2011 | Rahman | H03H 11/1291 | 455/307 |
| 8,064,845 B2 * | 11/2011 | Chu | H04B 1/48 | 455/78 |
| 8,103,221 B2 * | 1/2012 | Ta | H01P 1/15 | 455/81 |
| 8,120,943 B2 * | 2/2012 | Parkinson | G11C 13/0004 | 365/148 |
| 8,283,896 B1 * | 10/2012 | Goluszek | H02M 3/1582 | 320/145 |
| 8,288,829 B2 * | 10/2012 | Zhang | H01L 27/088 | 257/392 |
| 8,327,764 B2 * | 12/2012 | Trousselle | F42B 3/182 | 102/202.3 |
| 8,493,128 B2 * | 7/2013 | Adamski | H03K 17/693 | 327/365 |
| 8,508,207 B2 * | 8/2013 | Burns | H02M 3/158 | 323/283 |
| 8,542,038 B2 * | 9/2013 | Huang | G09G 3/3685 | 327/108 |
| 8,648,583 B2 * | 2/2014 | Brown | H02M 1/38 | 323/282 |
| 8,947,130 B2 * | 2/2015 | Fan | H03F 3/45183 | 327/108 |
| 8,988,117 B2 * | 3/2015 | Li | H03K 19/00361 | 327/108 |
| 8,994,347 B2 * | 3/2015 | Galbis | H03F 1/0216 | 323/271 |
| 9,024,700 B2 * | 5/2015 | Ranta | H03K 17/102 | 333/17.3 |
| 9,143,184 B2 * | 9/2015 | Gorbachov | H04B 1/48 | |
| 9,148,086 B2 * | 9/2015 | Fife | H02H 3/081 | |
| 9,184,731 B2 * | 11/2015 | Lam | H03H 11/245 | |
| 9,231,646 B1 * | 1/2016 | Liu | H04B 1/44 | |
| 9,300,352 B2 * | 3/2016 | Brinkhoff | H04B 1/48 | |
| 9,466,976 B2 * | 10/2016 | Gray | H02H 9/042 | |
| 9,602,098 B2 * | 3/2017 | Prevost | H04B 1/0458 | |
| 9,667,227 B2 * | 5/2017 | Ranta | H01G 7/00 | |
| 9,673,731 B2 * | 6/2017 | Cheng | H02M 7/44 | |
| 9,793,890 B2 * | 10/2017 | Kirchner | H03K 17/168 | |
| 9,800,238 B2 * | 10/2017 | Prevost | H03K 17/165 | |
| 10,033,349 B2 * | 7/2018 | Gamal El Din | H03H 7/20 | |
| 10,116,347 B1 * | 10/2018 | Xu | H03F 3/72 | |
| 10,153,803 B2 * | 12/2018 | Sugawara | H04B 1/18 | |
| 10,243,553 B2 * | 3/2019 | Kirchner | H03K 17/168 | |
| 10,277,268 B2 * | 4/2019 | Shanjani | H04B 1/406 | |
| 10,345,084 B1 * | 7/2019 | Nance | F42B 3/12 | |
| 10,673,412 B1 * | 6/2020 | Weale | H03K 17/102 | |
| 10,686,484 B2 * | 6/2020 | Shanjani | H04B 1/44 | |
| 10,735,044 B2 * | 8/2020 | Xu | H03F 3/72 | |
| 2001/0039601 A1 * | 11/2001 | Leung | G11C 29/808 | 711/101 |
| 2002/0037054 A1 * | 3/2002 | Schurig | H04B 3/548 | 375/257 |
| 2003/0114143 A1 * | 6/2003 | Kulseth | H04M 1/66 | 455/410 |
| 2006/0001559 A1 * | 1/2006 | Tuttle | H04B 1/30 | 341/120 |
| 2006/0007620 A1 * | 1/2006 | Ochi | H02H 9/004 | 361/93.1 |
| 2006/0135084 A1 * | 6/2006 | Lee | H04B 1/48 | 455/78 |
| 2006/0164904 A1 * | 7/2006 | Saleh | G11C 16/24 | 365/226 |
| 2006/0238037 A1 * | 10/2006 | Oh | H04L 25/03878 | 307/409 |

(56) References Cited

U.S. PATENT DOCUMENTS

| | | | | |
|---|---|---|---|---|
| 2007/0042802 A1* | 2/2007 | Park | H04B 1/0071 | 455/552.1 |
| 2007/0213017 A1* | 9/2007 | Chen | H04B 1/3877 | 455/101 |
| 2007/0232241 A1* | 10/2007 | Carley | H04B 1/44 | 455/83 |
| 2007/0273456 A1* | 11/2007 | Miyaguchi | H03H 11/20 | 333/103 |
| 2008/0035073 A1* | 2/2008 | Napolez | A01K 15/021 | 119/720 |
| 2008/0096514 A1* | 4/2008 | Rahman | H03H 11/1256 | 455/307 |
| 2008/0181617 A1* | 7/2008 | Ann | H04B 10/1149 | 398/158 |
| 2008/0197204 A1* | 8/2008 | Whitney | G08B 17/00 | 236/51 |
| 2008/0225987 A1* | 9/2008 | Fazzi | H03K 19/018521 | 375/316 |
| 2008/0233913 A1* | 9/2008 | Sivasubramaniam | H04B 1/18 | 455/232.1 |
| 2008/0278975 A1* | 11/2008 | Degen | H02M 3/33523 | 363/21.18 |
| 2008/0290151 A1* | 11/2008 | Usmani | A47G 29/1212 | 232/35 |
| 2009/0036089 A1* | 2/2009 | Blin | H04B 1/1607 | 455/343.1 |
| 2009/0109771 A1* | 4/2009 | Cox | G11C 7/1045 | 365/194 |
| 2009/0116280 A1* | 5/2009 | Parkinson | G11C 13/004 | 365/163 |
| 2009/0174691 A1* | 7/2009 | Yeo | G09G 5/008 | 345/204 |
| 2009/0298443 A1* | 12/2009 | Ta | H01P 1/15 | 455/83 |
| 2010/0001351 A1* | 1/2010 | Zhang | H01L 27/0207 | 257/392 |
| 2010/0020595 A1* | 1/2010 | Parkinson | G11C 13/0069 | 365/163 |
| 2010/0060340 A1* | 3/2010 | Hester | H03K 17/6871 | 327/401 |
| 2010/0085980 A1* | 4/2010 | Hinosugi | H04L 49/552 | 370/412 |
| 2011/0002080 A1* | 1/2011 | Ranta | H01G 7/00 | 361/277 |
| 2011/0143690 A1* | 6/2011 | Jerng | H04B 1/44 | 455/78 |
| 2011/0187537 A1* | 8/2011 | Touchton | A01K 29/005 | 340/573.3 |
| 2011/0290899 A1* | 12/2011 | Petrovich | A01G 15/00 | 239/14.1 |
| 2012/0105039 A1* | 5/2012 | Brown | H02M 1/08 | 323/283 |
| 2012/0105045 A1* | 5/2012 | Burns | H02M 1/38 | 323/311 |
| 2012/0140122 A1* | 6/2012 | Lai | H04B 1/18 | 348/707 |
| 2012/0256660 A1* | 10/2012 | Huang | G09G 3/3685 | 327/108 |
| 2012/0262217 A1* | 10/2012 | Gorbachov | H04B 1/48 | 327/382 |
| 2013/0035048 A1* | 2/2013 | Chee | H04B 1/48 | 455/83 |
| 2013/0076157 A1* | 3/2013 | Stein | A61B 5/1036 | 307/116 |
| 2013/0105951 A1* | 5/2013 | Popovich | H02H 9/046 | 257/659 |
| 2013/0106518 A1* | 5/2013 | Ogasawara | H03F 1/565 | 330/296 |
| 2013/0110318 A1* | 5/2013 | Colja | H02J 7/025 | 701/2 |
| 2013/0210477 A1* | 8/2013 | Peter | H04B 17/103 | 455/522 |
| 2014/0002214 A1* | 1/2014 | Bawell | H01C 1/16 | 333/81 R |
| 2014/0128009 A1* | 5/2014 | Yeh | H04B 1/48 | 455/83 |
| 2014/0198700 A1* | 7/2014 | Kim | H04L 47/56 | 370/311 |
| 2014/0213200 A1* | 7/2014 | Brinkhoff | H04B 1/48 | 455/83 |
| 2014/0265900 A1* | 9/2014 | Sadwick | H05B 45/325 | 315/200 R |
| 2014/0327992 A1* | 11/2014 | Sykes | H02H 7/222 | 361/56 |
| 2014/0340799 A1* | 11/2014 | Gray | H02H 9/005 | 361/56 |
| 2014/0349595 A1* | 11/2014 | Cox | H04B 1/0458 | 455/78 |
| 2015/0080901 A1* | 3/2015 | Stein | A61B 5/4566 | 606/102 |
| 2015/0107646 A1* | 4/2015 | Fife | H02H 7/20 | 136/244 |
| 2015/0171828 A1* | 6/2015 | Lam | H03H 11/245 | 333/81 R |
| 2015/0318889 A1* | 11/2015 | Lee | H04B 1/44 | 455/78 |
| 2016/0013760 A1* | 1/2016 | Lam | H03F 1/0277 | 330/277 |
| 2016/0043710 A1* | 2/2016 | Crandall | H03K 17/6872 | 327/374 |
| 2016/0065206 A1* | 3/2016 | Ho | H04L 25/0266 | 455/83 |
| 2016/0118909 A1* | 4/2016 | Cheng | H02M 7/44 | 363/71 |
| 2016/0227319 A1* | 8/2016 | Zhao | H04R 27/00 | |
| 2017/0105265 A1* | 4/2017 | Sadwick | F21K 9/238 | |
| 2017/0111065 A1* | 4/2017 | Cook | H03F 3/211 | |
| 2017/0230049 A1* | 8/2017 | Shapiro | H04B 1/0458 | |
| 2017/0264251 A1* | 9/2017 | Cook | H03F 3/195 | |
| 2018/0019787 A1* | 1/2018 | Kotake | F24F 11/89 | |
| 2018/0062582 A1* | 3/2018 | Pehlivanoglu | H03F 3/195 | |
| 2018/0076612 A1* | 3/2018 | Lavertu | H01H 33/596 | |
| 2018/0083665 A1* | 3/2018 | Sugawara | H03H 7/38 | |
| 2018/0112837 A1* | 4/2018 | Sadwick | H05B 45/3725 | |
| 2018/0131453 A1* | 5/2018 | Sharma | H04B 17/14 | |
| 2018/0167062 A1* | 6/2018 | Shanjani | H03K 17/04123 | |
| 2018/0190106 A1* | 7/2018 | Hamain | G06F 3/014 | |
| 2018/0262163 A1* | 9/2018 | Tokuda | G05F 3/26 | |
| 2018/0262166 A1* | 9/2018 | Takagi | H03F 1/302 | |
| 2018/0316382 A1* | 11/2018 | Xu | H04B 1/48 | |
| 2018/0331713 A1* | 11/2018 | Liu | H01L 27/1203 | |
| 2018/0331715 A1* | 11/2018 | Xu | H04B 1/48 | |
| 2018/0336372 A1* | 11/2018 | Fleming | H01L 27/00 | |
| 2018/0351599 A1* | 12/2018 | Shanjani | H04B 1/1615 | |
| 2019/0058388 A1* | 2/2019 | Tsubamoto | H02M 7/797 | |
| 2019/0260415 A1* | 8/2019 | Shanjani | H04B 1/1615 | |

OTHER PUBLICATIONS

Nguyen, et al., Applicant-Initiated Interview Summary received from the USPTO dated Apr. 24, 2019 for U.S. Appl. No. 15/612,941, 3 pgs.

PSEMI Corporation, Preliminary Amendment filed in the USPTO dated Apr. 27, 2018 for U.S. Appl. No. 15/612,941, 9 pgs.

PSEMI Corporation, Section 312 Amendment filed in the USPTO dated Apr. 18, 2019 for U.S. Appl. No. 15/612,941, 9 pgs.

PSEMI Corporation, Reply to Applicant-Initiated Interview Summary filed in the USPTO dated May 23, 2019 for U.S. Appl. No. 15/612,941, 2 pgs.

Nguyen, et al., Office Action received from the USPTO dated Oct. 7, 2019 for U.S. Appl. No. 16/352,647, 19 pgs.

Nguyen, et al., Notice of Allowance received from the USPTO dated Feb. 11, 2020 for U.S. Appl. No. 16/352,647, 17 pgs.

PSEMI Corporation, Preliminary Amendment filed in the USPTO dated May 8, 2019 for U.S. Appl. No. 16/352,647, 12 pgs.

(56) References Cited

OTHER PUBLICATIONS

PSEMI Corporation, Preliminary Amendment filed in the USPTO dated Jan. 6, 2020 for U.S. Appl. No. 16/352,647, 10 pgs.

\* cited by examiner

METHOD AND APPARATUS FOR SWITCHING OF SHUNT AND THROUGH SWITCHES OF A TRANSCEIVER

CROSS-REFERENCE TO RELATED APPLICATIONS—CLAIM OF PRIORITY

This application is a continuation of, and claims the benefit of priority under 35 USC § 120 of, commonly assigned and prior U.S. application Ser. No. 16/352,647, filed Mar. 13, 2019, entitled "Method and Apparatus for Switching of Shunt and Through Switches of a Transceiver", the disclosure of which is incorporated herein by reference in its entirety. Application Ser. No. 16/352,647 is a continuation of, and claims the benefit of priority under 35 USC § 120 of, commonly assigned prior U.S. application Ser. No. 15/612,941, filed Jun. 2, 2017, "Method and Apparatus for Switching of Shunt and Through Switches of a Transceiver", now U.S. Pat. No. 10,277,268 issued Apr. 30, 2019, the disclosure of which is incorporated herein by reference in its entirety.

BACKGROUND

(1) Technical Field

This disclosure relates to transceivers, and more specifically to methods and apparatus for switching between transmit mode and receive mode within a transceiver.

(2) Background

In many instances today, a single antenna is connected to a transceiver for both transmission and reception. FIG. 1 is a simplified illustration of some of the components of one such transceiver 100. The transceiver 100 includes an antenna 102 connected to the first port 104 of a three-port Radio Frequency (RF) circulator 106. A three-port circulator has a relatively low impedance for signals between counter-clockwise adjacent ports and a relatively high impedance between clockwise adjacent ports. Accordingly, there is a low impedance path through the circulator from the first port 104 to the second port 108. Likewise, there is a relatively low impedance from the second port 108 to the third port 124 and from the third port 124 to the first port 104. However, in the other direction through the circulator, there is a relatively high impedance from the first port 104 to the third port 124, from the third port 124 to the second port 108 and from the second port to the first port 104.

The second port 108 of the circulator 106 is coupled to the receiver section 110 of the transceiver 100 and to a detector section 111. Looking first at the receiver section 110, the second port 108 of the circulator 106 is coupled to a first port of a "through switch" 112 within the receiver section 110. In some cases, the through switch 112 is a field effect transistor (FET), and the first signal port of the through switch 112 is the drain of the FET. The receiver section 110 further includes a direct current (DC) blocking capacitor 114, a low noise amplifier (LNA) 116, a shunt switch 118 and a bias control circuit 120. In the case in which the through switch 112 is a FET, the second signal port is the source of the FET of the through switch 112. In some cases, the drain and source of the FET of the through switch 112 are interchangeable. The source is coupled to a first terminal of the DC blocking capacitor 114. A second terminal of the DC blocking capacitor 114 is coupled to the input of the LNA 116.

A first signal port of the shunt switch 118, which in some cases is the drain of a FET, is also coupled to the source of the through switch 112. The second signal port is the source of the FET shunt switch 118. The source is coupled to ground. In receive mode, the shunt switch 118 and the through switch 112 work together to couple signals from the antenna 102 to the input of the LNA 116. That is, by turning on the through switch 112 and turning off the shunt switch 118, signals received through the antenna 102 are routed from the first port 104 of the circulator 106 to the second port of the circulator 108. The signals then follow the low impedance path through the through switch 112. The relatively high impedance of the non-conducting ("OFF") shunt switch blocks the signal from shunting to ground. It should be noted that throughout this disclosure, the term "on" is used to refer to the operational state of a FET or other switching device in which there is a low impedance between the drain and source (or in non-FET devices, between the switch terminals). Likewise, the term "off" is used to refer to the operational state in which a high impedance is presented between the switch terminals (e.g., drain and source).

Looking next at the detector section 111, a similar arrangement of switches 113, 115 provides a path from the second port 108 of the circulator 106 to a 50 ohm detector 117 within the detector section 111 when the switch 113 is on and the switch 115 is off. The same signal that turns on the shunt switch 118 of the receiver section 110 is coupled to the control port to turn on the switch 113 in the detector section 111. Likewise, the switches 112 and 115 are controlled by the same signal. Therefore, when the switch 112 in the receiver section 110 is off, the switch 115 in the detector section 111 is also off. Accordingly, either the LNA 116 of the receiver section 110 or the detector 117 of the detector section 111 is coupled to the second output of the circulator 106 at any particular time. More particularly, when the transceiver 100 is in receive mode, the LNA 116 of the receiver section 110 is coupled to the port 108 of the circulator 106 and the input to the detector 117 is shunted to ground. When the transceiver 100 is in transmit mode, the detector 117 is coupled to the port 108 of the circulator 106 and the input to the LNA 116 is shunted to ground. The 50 ohm detector 117 provides a proper load for the circulator 106.

RF signals traverse the relatively low impedance path through the DC blocking capacitor 114 and are applied to the input of the LNA 116. In the case shown in FIG. 1, the bias control circuit 120 provides DC bias to the input of the LNA 116. In some cases, a timing processor 126 determines when the transceiver 100 is in transmit mode and when the transceiver 100 is in receive mode. The timing processor 126 can be as simple as some circuitry in the modulator/demodulator of the transceiver for determining when data is ready to be sent. Alternatively, the timing processor 126 can be a more sophisticated programmable device that determines the mode of the transceiver 100 based on several factors. The timing processor 126 provides a control signal 128 to the bias control circuit 120. In some cases, the bias control circuit 120 provides a bias that is appropriate to the mode of the transceiver (e.g., transmit or receive), as indicated by the control signal 128. The through switch 112 is turned on by applying a mode control signal $V_{on}$ to the control port (e.g., the gate) of the through switch 112. In some cases, the signal $V_{on}$ is generated by the timing processor 126. An inverse mode control signal $\overline{V_{on}}$ that is the inverse of the signal $V_{on}$ is applied to the control port (e.g., the gate) of the shunt switch 118. Thus, when the through switch 112 is turned on, the shunt switch 118 is turned off (assuming both FETs 112, 118 are the same, i.e., either P-channel or N-channel FETs).

The transceiver 100 further includes a transmit amplifier 122 that is coupled to the third port 124 of the circulator 106. In transmit mode, the transmit amplifier 122 outputs a transmit signal that is coupled through the third port 124 of the circulator 106 to the first port 104 of the circulator 106. As noted above, the circulator 106 has a relatively high isolation between the input to the third port 124 and the output from the second port 108. Therefore, the power applied to the input port 124 is principally coupled to the antenna 102. Nonetheless, in order to protect the LNA 116, the through switch 112 disconnects the LNA 116 from the antenna 102. In addition, the shunt switch 118 further isolates the input of the LNA 116 by coupling the input of the LNA 116 to ground through the DC blocking capacitor 114 and the shunt switch 118. Any power that is inadvertently coupled to the second port 108 of the circulator is isolated from the input of the LNA 116 by the high impedance between the drain and the source of the through switch 112, which is off during transmit mode and also by the low impedance to ground presented by the shunt switch 118 which is on during transmit mode.

When implementing the through switch 112 and the shunt switch 118 as FET switches, the through switch 112 must be capable of sustaining a relatively high drain to source voltage without breaking down. Therefore, the through switch 112 must be relatively large. Typically, this is implemented by stacking several individual FETs together to form the through switch 112. The number of FETs that are stacked depends upon several factors, including the drain to source voltage that the switch 112 is designed to withstand. In some cases, the shunt switch 118 also comprises several stacked FETs.

Each FET of the through switch 112 has a capacitance $C_{gs}$ between the gate and source. These capacitances $C_{gs}$ are in parallel. Therefore, the capacitance $C_{gs}$ of each FET sums to form a total capacitance between the control terminal of the through switch 112 and the input of the LNA 116. When the through switch 112 changes state from off to on, the voltage swings from −V to +V for a total swing of 2V. That voltage, multiplied by the capacitance $C_{gs}$, determines the charge Q that is applied to the input of the LNA 116. In light of the relatively large value of the capacitance $C_{gs}$, the charge Q applied to the input of the LNA 116 can be substantial. In some cases, it could increase the gate voltage at the LNA input to an unsafe value. In some cases, this large voltage can cause a breakdown of the input of the LNA 116.

FIG. 2 is graph showing the voltage $V_g$ applied to the input of the LNA 116 at the time the transceiver transitions from transmit mode to receive mode. FIG. 2 also shows the transition of the state of the signals $V_{on}$ and $\overline{V_{on}}$. As can be seen in FIG. 2, prior to time $t_0$, the DC component of the voltage $V_g$ is at (or near) the transmit mode bias level (i.e., the voltage provided from the bias control circuit 120 to the LNA input during the transmit mode. Any RF component of the signal that is present is disregarded for the purpose of this analysis). At time $t_0$, the signal $V_{on}$ begins to transition from a low state, $V_{low}$, to a high state, $V_{high}$. Since the signal $\overline{V_{on}}$ is the inverse of the signal $V_{on}$, the signal $\overline{V_{on}}$ will also start to transition from a high state, $V_{high}$, to a low state, $V_{low}$. Accordingly, the charge that has been stored in the capacitance $C_{gs}$ of the through switch 112 will cause the voltage $V_g$ to rise as the through switch 112 starts to conduct and the shunt switch 118 turns off. In addition, the bias control circuit 120 attempts to transition the bias voltage at the input of the LNA 116 to a receive mode bias level. The voltage $V_g$ rises to a peak at time $t_1$, primarily as a consequence of the charge stored in the capacitance $C_{gs}$ of the through switch 112. Starting at time $t_1$, the voltage $V_g$ decreases until at time $t_2$ the voltage Vg reaches the receive mode bias level established by the bias control circuit 120. Finally, at time $t_3$, the voltage stabilizes at the desired receive mode bias level.

There are two principle problems with the current transceiver 100. The first is that the amount of charge stored in the capacitance $C_{gs}$ of the through switch 112 can be sufficiently great that the voltage $V_g$ at time $t_1$ damages the LNA input (i.e., breaks through the gate of the input FET of the LNA 116). The second problem is that during the relatively long time between $t_0$ and $t_3$ the LNA bias is disturbed, leading to fluctuations in the operation of the LNA 116, such as increased non-linear behavior. That is, the amount of time it takes to stabilize $V_g$ at the receive mode bias level, causes the operation of the LNA 116 to vary for an undesirable amount of time.

It can be seen that there is currently a need for a method and apparatus that reduces the risk of damage to the input of an LNA of a transceiver during transitions from transmit mode to receive mode. In addition, there is a need for a method and apparatus that reduces the amount of variation at the LNA output during the transition to receive mode. The present disclosure presents a method and apparatus that meets this need.

SUMMARY

A transceiver and associated method for operating the transceiver are disclosed. The transceiver and disclosed method mitigate against distortion at the LNA output and an undesirable rise in the voltage at the input to an LNA of the transceiver when the transceiver transitions from transmit mode to receive mode. In particular, the transceiver has a timing control circuit that offsets the time at which a through switch and a shunt switch transition between on and off states. The output of the timing control circuit is an inverted and delayed version of a control signal applied to the input of the timing control circuit. By controlling the timing of the shunt switch with respect to the through switch, the voltage applied to the input of the LNA can be maintained at safe levels. In particular, controlling the timing of the shunt switch provides a means to safely discharge any accumulated charge within the capacitance $C_{gs}$ between the gate and source of transistors included within the through switch.

The details of one or more embodiments of the disclosed method and apparatus are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

Figure 1:
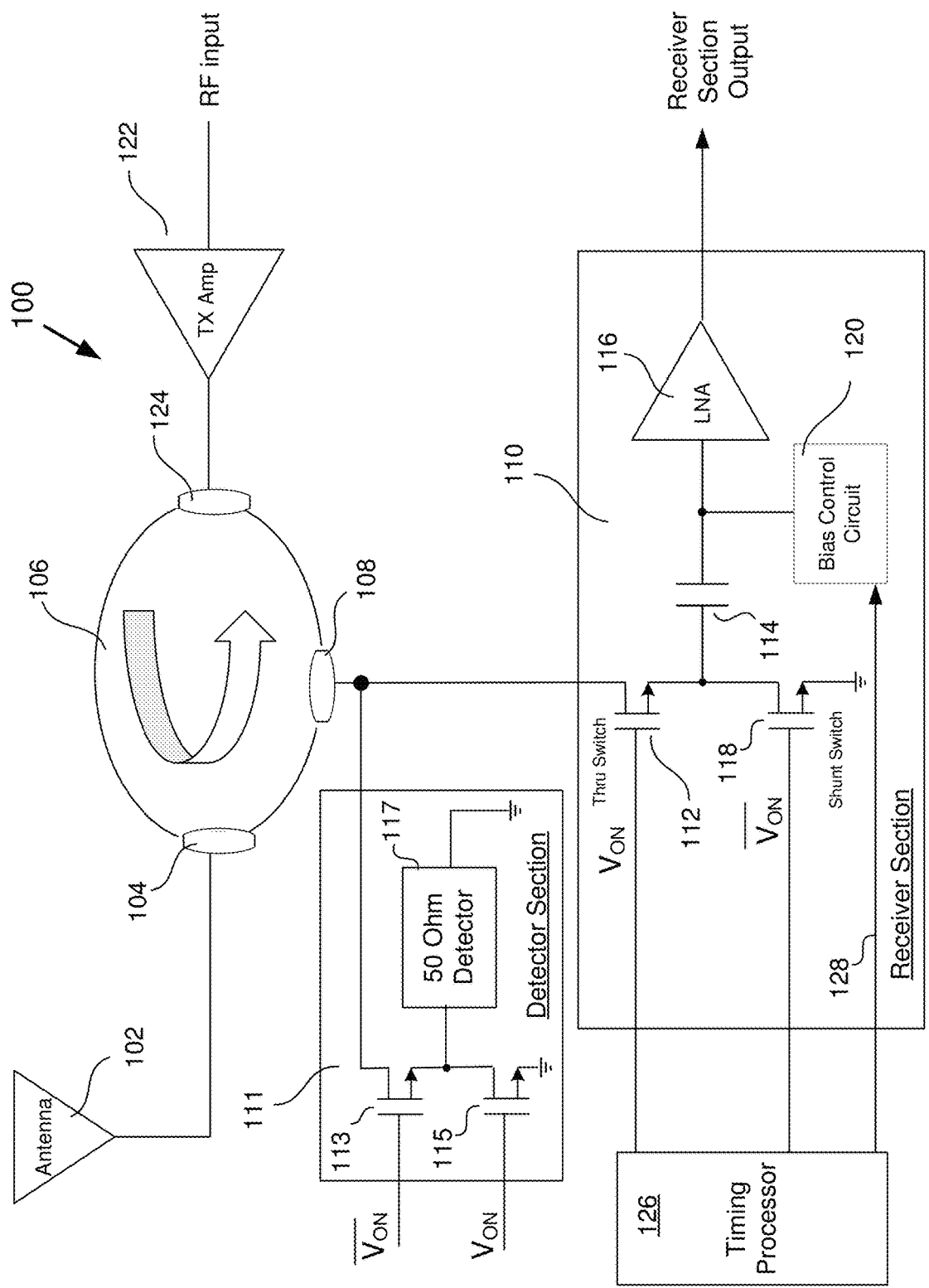
FIG. 1 is a simplified illustration of some of the components of a transceiver in accordance with at least one embodiment of the disclosed method and apparatus.
Figure 3:
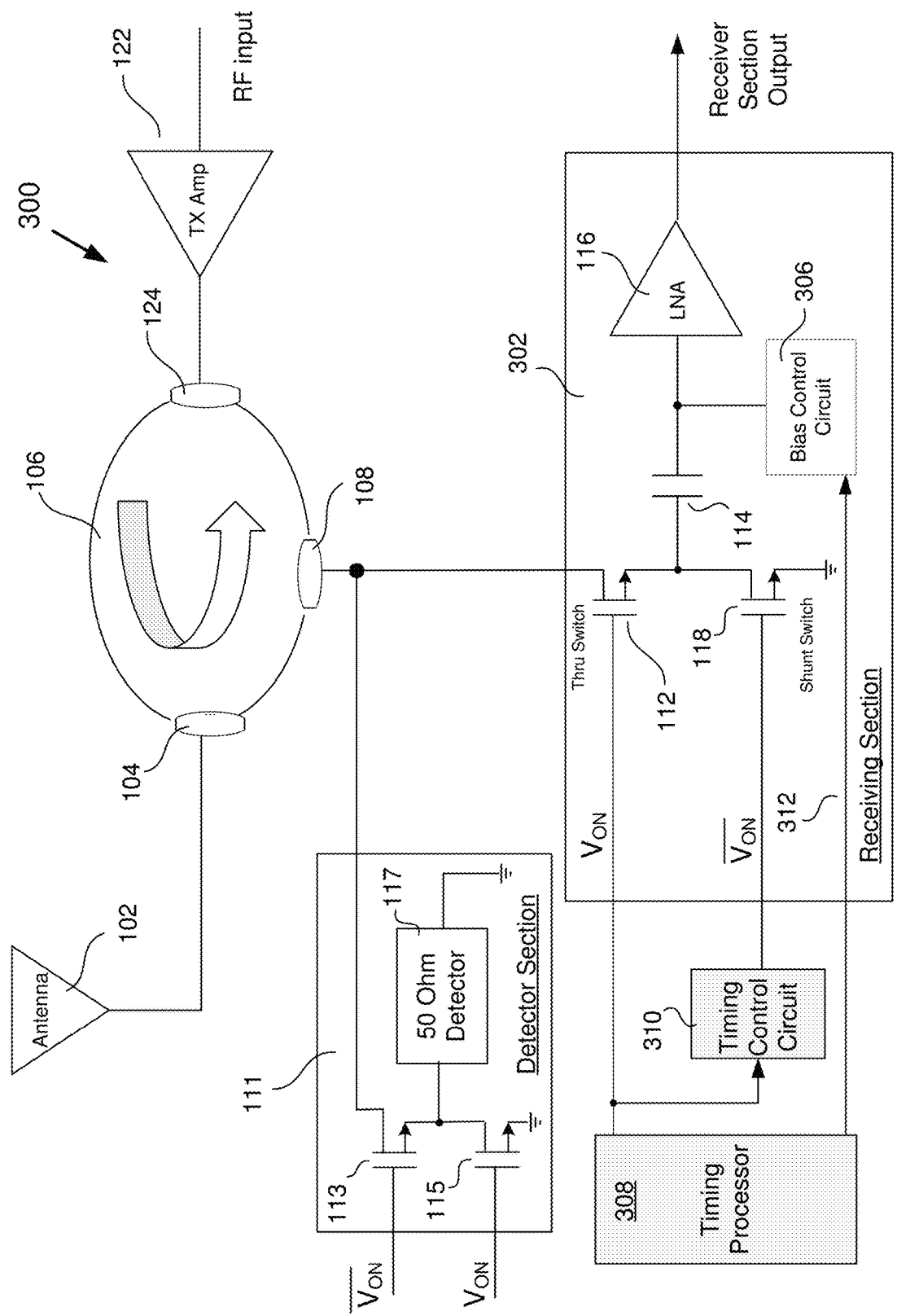
FIG. 3 is a simplified illustration of a transceiver having an antenna that is shared by a receiving section and a transmit amplifier.

FIG. 3 is a simplified illustration of a transceiver 300 having an antenna 102 that is shared by a receiving section 302 and a transmit amplifier 122. The transceiver 300 further includes a three-port circulator 106, a timing processor 308 and a timing control circuit 310. Similar to the circulator 106 show in FIG. 1 and discussed above, the circulator 106 couples transmit signals from the transmit amplifier 122 to the antenna 106. In addition, signals that are received by the antenna are coupled by the circulator 106 to the receive section 302 of the transmitter 300. It will be understood by those skilled in the art that other types of devices can be used to direct the power from the transmit amplifier 122 to the antenna 102 and to couple signals received by the antenna 102 to the receiving section 302. The circulator 106 is merely shown as one example of a device used in a transceiver in accordance with the disclosed method and apparatus.

The timing processor 308 is any programmable controller, microprocessor, state machine, or any discrete hardware and/or firmware that is capable of receiving and/or generating information regarding when the transceiver 300 is to be in receive mode versus when the transceiver 300 is to be in transmit mode and for generating a mode control signal $V_{on}$ and an input signal to the bias control circuit 306. In some embodiments, the timing processor 308 is integrated into the modulator/demodulator of the transceiver 300. The particular mechanism used by the timing processor 308 to determine when the transceiver 300 is in transmit mode and when the transceiver 300 is in receive mode is well-known. Therefore, for the sake of simplicity and efficiency, the details of the operation of the timing processor 308 are not disclosed herein. However, those skilled in the art will know how to provide such a timing processor 308 for performing the functions disclosed. The receiving section 302 of the transceiver 300 includes a through switch 112, DC blocking capacitor 114, LNA 116, shunt switch 118 and bias control circuit 306. The combination of the receiving section 302, timing processor 308 and timing control circuit 310 can be referred to as a switching network within the transceiver 100.

Figure 4:
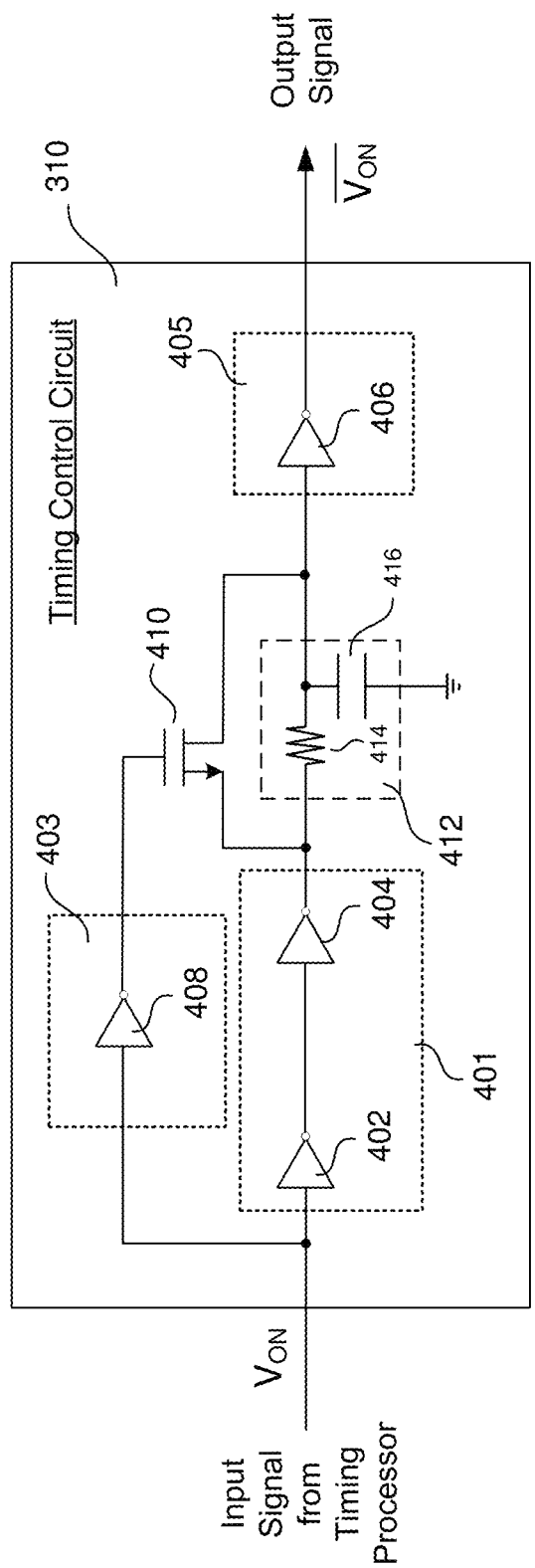
FIG. 4 is a schematic of one embodiment of the timing control circuit.

FIG. 4 is a schematic of one embodiment of the timing control circuit 310. In some embodiments, the timing control circuit 310 outputs an inverse mode control signal $\overline{V_{on}}$. The inverse mode control signal $\overline{V_{on}}$ is an inverted and delayed version of the signal $V_{on}$. In some embodiments, the timing control circuit 310 includes three inverter groups 401, 403, 405, a bypass switch 410, and an RC delay circuit 412. The first inverter group 401 includes an even number of inverters. In the embodiment shown in FIG. 4, there are two inverters 402, 404 in the first inverter group 401. However, it will be understood that any even number of inverters can be used, depending upon the amount of delay to be provided through the first inverter group 401. The output of the first inverter group 401 is coupled to the input of the RC delay circuit 412. Since the first inverter group 401 has an even number of inverters, the delay circuit input signal is a delayed version of the mode control signal with no inversion. In some embodiments, the second inverter group 403 has one inverter 408. However, it will be understood that the second inverter group 403 can have any odd number of inverters that is less than the number of inverters included in the first inverter group 401. The third inverter group 405 also has an odd number of inverters. While only one inverter 406 is shown in FIG. 4, any odd number can be used.

The RC delay circuit 412 includes a resistor 414 and a capacitor 416. In the embodiment shown in FIG. 4, the bypass switch 410 is a FET. The drain of the FET 410 is coupled to input of the RC delay circuit 412. The source of the FET 410 is coupled to the output of the RC delay circuit 412. Accordingly, when the FET 410 is conducting, the FET 410 establishes a low impedance bypass path around the RC delay circuit 412. The gate of the FET 410 is coupled to the output of the second inverter group 403. The output of the second inverter group 403 is a bypass control signal. It can be seen that the bypass control signal is, therefore, a delayed and inverted version of the mode control signal $V_{on}$. In some embodiments, the delay imposed on the mode control signal $V_{on}$ by the second inverter group 403 is shorter than the delay imposed by the first inverter group 401 (i.e., there are few inverters in the second inverter group 403 than in the first inverter group 401).

When the mode control signal $V_{on}$ changes from a low voltage to a high voltage, the signal applied to the gate of the FET 410 goes from high to low, and the FET 410 turns off (i.e., operates with high impedance between the drain and source). Turning off the FET 410 removes the bypass path. In some embodiments, the delay imposed by the first inverter group is longer than the delay imposed by the second inverter group 403. This ensures that when the mode control signal $V_{on}$ goes high, the FET 410 has sufficient time to turn off and stop conducting before the output of the first inverter group 401 changes state. The high impedance path provided by the FET 410 places the delay circuit 412 in the signal path. Therefore, the RC time constant of the combination of the resistor 414 and the capacitor 416 will determine the rise time of the signal at the input of the third inverter group 405. The values of the resistor 414 and capacitor 416 are set to establish a desired delay in the transition of the inverse mode control signal $\overline{V_{on}}$ from high to low with respect to the transition of the mode control signal $V_{on}$ from low to high.

The third inverter group 405 has an odd number of inverters. Accordingly, the output $\overline{V_{on}}$ of the timing control circuit 310 is the inverse of the input $V_{on}$ to the circuit 310. In addition, in some embodiments, the output stage of the third inverter group 405 has a relatively fast rise and fall time to ensure that the inverse mode control signal $\overline{V_{on}}$ will have a relatively fast transition, once that transition occurs.

On the other hand, when the mode control signal $V_{on}$ changes state from a high voltage state to a low voltage state, the FET 410 will turn on, providing a low impedance bypass path around the RC delay circuit 412 (i.e., from the output of the second inverter 404 to the input of the third inverter 406). By establishing a bypass path around the RC delay circuit 412, the FET 410 reduces the amount of delay between the transition of the mode control signal $V_{on}$ and the transition of the inverse mode control signal $\overline{V_{on}}$. It should be noted that some delay will exist due to the three inverters 402, 404, 406. In some embodiments, the delay imposed by the RC delay circuit 412 when the FET 410 is not conducting is substantially greater than the delay of the inverters 402, 404, 406. Accordingly, the delay between the transition of $V_{on}$ from low voltage to high voltage and the transition of $\overline{V_{on}}$ from high voltage to low voltage will be greater than the delay between the transition of $V_{on}$ from high voltage to low voltage and the transition of $\overline{V_{on}}$ from low voltage to high voltage. That is, the inverse mode control signal $\overline{V_{on}}$ changing from high to low is delayed more than when the inverse mode control signal $\overline{V_{on}}$ changes from low to high.

Returning once again to FIG. 3, it can be seen that $V_{on}$ is coupled directly to the control port (i.e., the gate) of the through switch 112 from the timing processor 308. On the other hand, $\overline{V_{on}}$ is generated by the timing control circuit 310 and is delayed when transitioning from a first state (i.e., a high voltage) to a second state (i.e., a low voltage). Accordingly, when the timing processor 308 causes the transceiver 300 to change from transmit mode to receive mode, the through switch 112 will turn on some time before the shunt switch 118 turns off. In addition, the timing processor 308 will turn the transmit amplifier 122 off before turning the through switch 112 on. The delay in turning off the shunt switch 118 allows the charge that accumulated in the capacitance $C_{gs}$ of the FETs within the through switch to discharge through the shunt switch 118 to ground before the shunt switch 118 is turned off. In some embodiments, the delay is sufficiently long to permit at least 50% of the charge accumulated in the capacitance $C_{gs}$ to discharge before the shunt switch is opened. In other embodiments, the delay is sufficiently long to allow 75% of the charge accumulated in the capacitance $C_{gs}$ to discharge before the shunt switch is opened. In another embodiment, the delay is sufficiently long to allow 95% of the charge accumulated in the capacitance $C_{gs}$ to discharge before the shunt switch is opened. In some embodiments, the delay is 50 ns.

Figure 2:
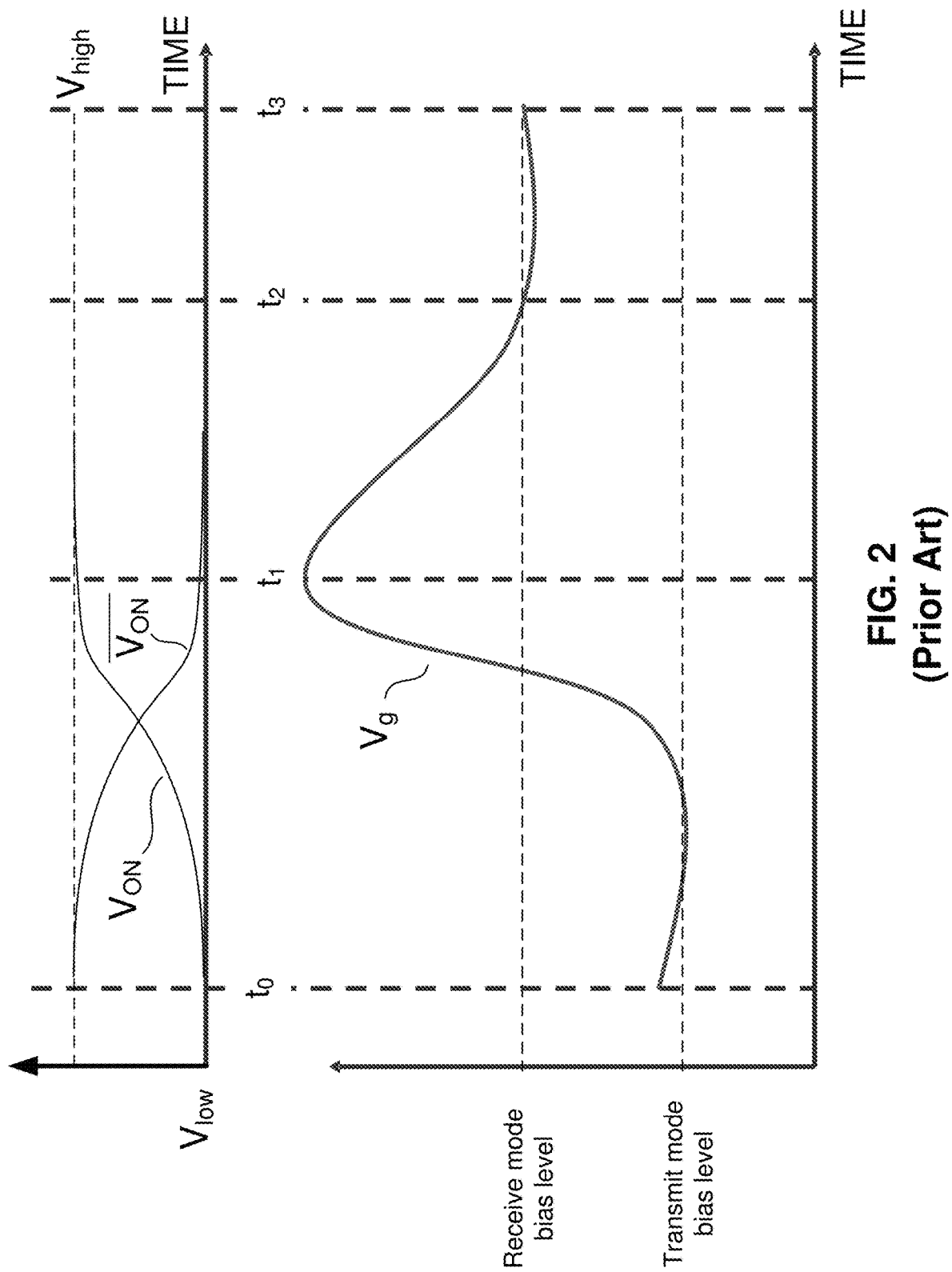
FIG. 2 is graph showing the voltage $V_g$ applied to the input of an LNA over time as the state of signals $V_{on}$ and $\overline{V_{on}}$ transition, causing the transceiver to transition from transmit mode to receive mode.
Figure 5:
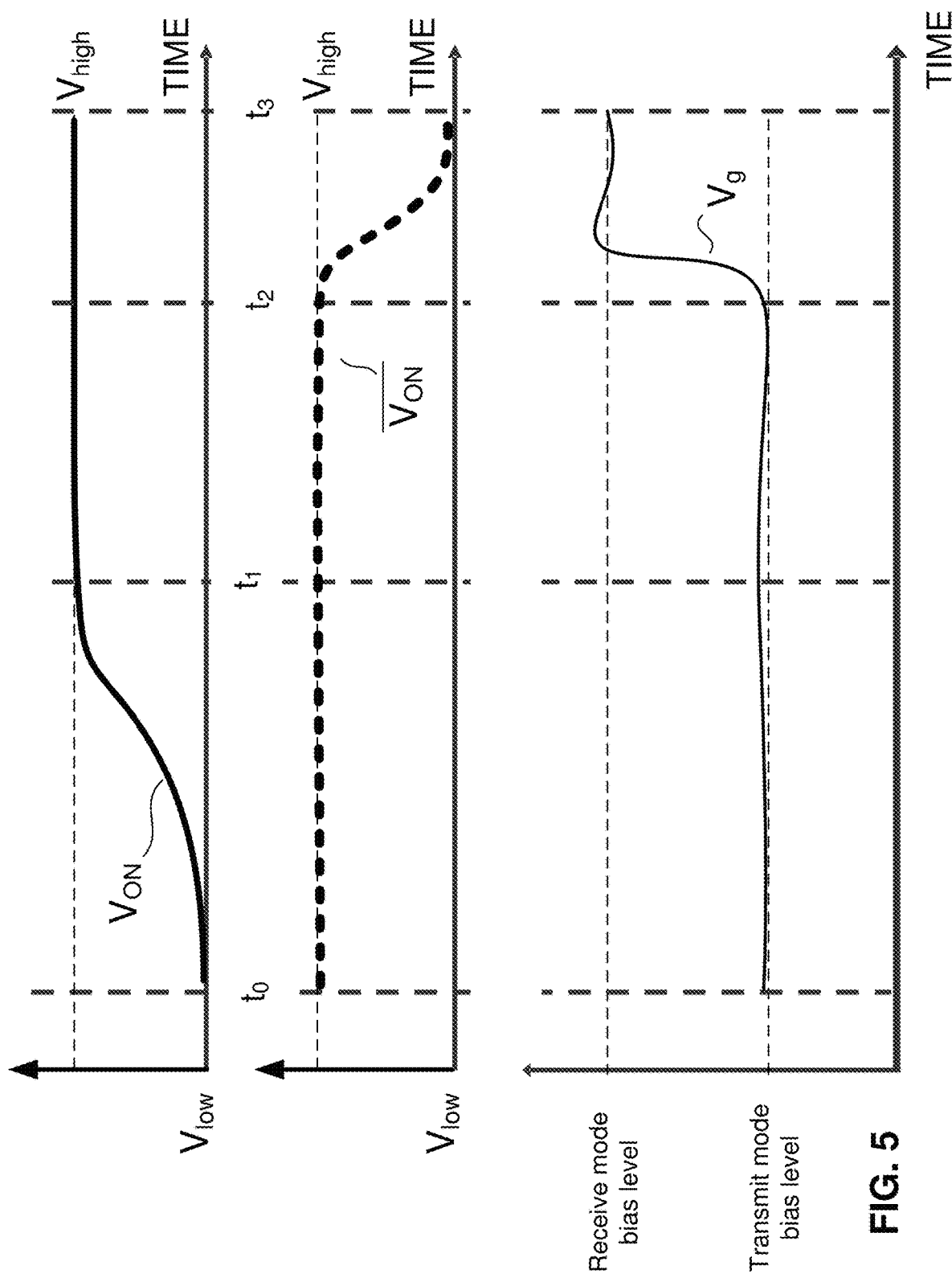
FIG. 5 is a graph illustrating the timing of the signals $V_{on}$ and $\overline{V_{on}}$ and the resulting voltage, $V_g$.

FIG. 5 is a graph illustrating the timing of $V_{on}$ and $\overline{V_{on}}$ and the resulting voltage, $V_g$. $V_{on}$ and $\overline{V_{on}}$ are shown in separate graphs in FIG. 5 to make it easier to see the shape of each signal. As shown in FIG. 5, at time $t_0$, the mode control signal $V_{on}$ generated by the timing processor 308 begins to rise. As $V_{on}$ rises, it turns on the through switch 112, beginning the process of switching the transceiver 300 to receive mode. As noted above, when $V_{on}$ transitions to a high voltage level, the FET 410 within the timing control circuit 310 turns off. Turning off the FET 410 causes the RC delay circuit 412 to delay the rise of the signal at the input of the third inverter 406 with respect to the rise of $V_{on}$. Accordingly, $\overline{V_{on}}$ output from the third inverter 406 does not begin to fall until time $t_2$. As shown in FIG. 2 and FIG. 5, $t_2$ occurs after the charge accumulated within the capacitance $C_{gs}$ of the through switch 112 has been discharged through shunt switch 118, due to the delay in $\overline{V_{on}}$. That is, the shunt switch 118 remains on (i.e., is conducting) between time $t_0$ and time $t_2$. At time $t_2$, $\overline{V_{on}}$ starts to fall. It should be noted that the inverse mode control signal $\overline{V_{on}}$ is provided by the output of the third inverter 406 (shown in FIG. 4). In some embodiments, providing an inverter 406 with a relatively fast transition from high to low yields an inverse mode control signal $\overline{V_{on}}$ with a shorter transition period than the mode control signal $V_{on}$.

The timing processor 308 provides a signal 312 to the bias control circuit 306 indicating the mode of operation (i.e., receive mode or transmit mode). The signal 312 causes the bias control circuit 306 to set the bias to the input of the LNA 116 to the appropriate level for the LNA 116 to operate in the indicated mode. Due to the delay in the transition of $\overline{V_{on}}$, the voltage $V_g$ remains at the transmit mode bias level until time $t_2$. At time $t_2$, the voltage $V_g$ starts to rise to the receive mode bias level set by the bias control circuit 306. With the transceiver 300 in receive mode, thru switch 112 is on and the shunt switch 118 is off. Therefore, an RF signal coupled through the DC blocking capacitor 114 to the input of the LNA 116 is superposed on the DC bias level set by the bias control circuit 306.

In some alternative embodiments, the signal 312 provided to the bias control circuit 306 is $V_{on}$. In such embodiments, the bias control circuit 306 changes the bias level provided to the input of the LNA 116 in response to $V_{on}$. In some such cases, the timing of the change in bias voltage provided to the LNA 116 from the bias control circuit 306 can be set within the bias control circuit 306 to take into account when the through switch 112 and/or the shunt switch 118 change state to ensure that the bias transitions smoothly from the transmit mode bias level to the receive mode bias level.

Delaying the fall of $\overline{V_{on}}$ ensures that the shunt switch 118 remains on long enough for the charge on the capacitance $C_{gs}$ to be shunted to ground through the shunt switch 118. In addition, the receive mode bias level $V_g$ at the input of the LNA 116 is achieved quickly upon the shunt switch 118 turning off, since the effects of the charge stored in $C_{gs}$ have been mitigated by the shunt switch 118. Therefore, the LNA 116 achieves linear operation quickly once the transceiver switches from transmit mode to receive mode. It should be noted that while the through switch 112 and the shunt switch 118 are shown as p-channel FETs, other types of transistors, and in fact, other types of semiconductor switches may be used. Furthermore, in alternative embodiments, the through switch 112 and the shunt switch 118 may not be the same type of switch. By replacing the inverter 406 with a non-inverting buffer, the through switch 112 and the shunt switch 118 can be fabricated such that one of the switches has a p-channel and the other has an n-channel. Accordingly, one turns on with a high voltage applied to the gate, while the other turns on with a low voltage applied to the gate.

Figure 6:
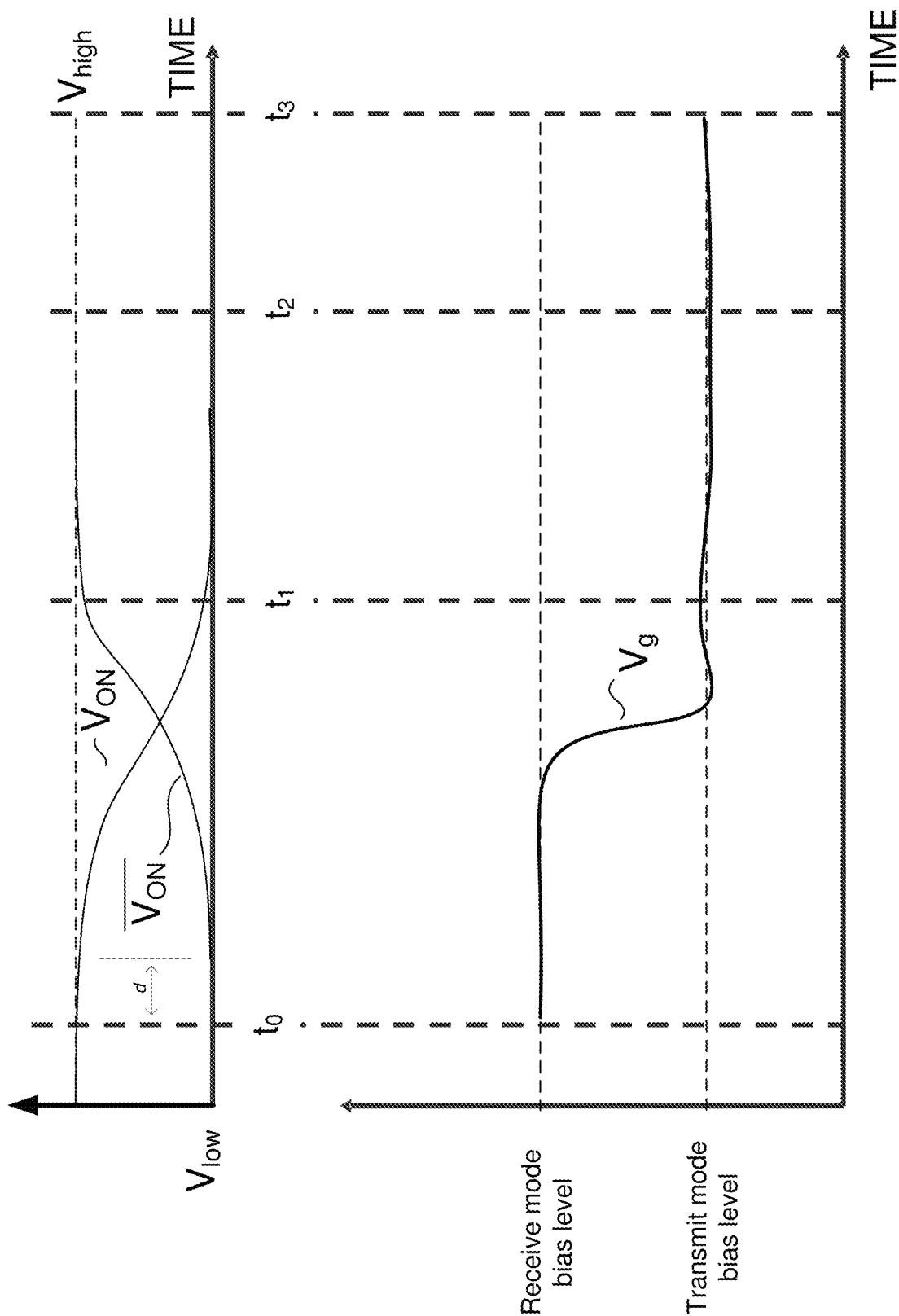
FIG. 6 is a graph showing the signals Von, $\overline{V_{on}}$, Vg as the transceiver transitions from receive mode to transmit mode.

FIG. 6 is a graph showing Von, $\overline{V_{on}}$, Vg as the transceiver transitions from receive mode to transmit mode. While the timing control circuit 310 generates $\overline{V_{on}}$ with a slight delay d with respect to $V_{on}$ (i.e., $\overline{V_{on}}$ starts to rise slightly after the $V_{on}$ starts to fall), the amount of delay is greater when transitioning from a first state in which the shunt switch is closed (i.e., from receive mode) to a second state in which the shunt switch is open (i.e., to transmit mode). In addition, in some embodiments, having a relatively fast inverter 406 at the output of the timing control circuit 310 can compensate for this slight delay d. Accordingly, the shunt switch 118 is turned on at nearly the same time as the through switch 112 is turned off, providing isolation of the LNA 116 from stray signals as soon as possible. Accordingly, in such embodiments, the output of the timing control circuit 310 is delayed only when transitioning from a first state in which the shunt switch is closed to a second state in which the shunt switch is open. In addition, the bias control circuit 306 changes the LNA bias from the receive bias mode level to the transmit bias mode level. The result is that $V_g$ transitions quickly from the receive mode bias level to the transmit mode bias level.

Figure 7:
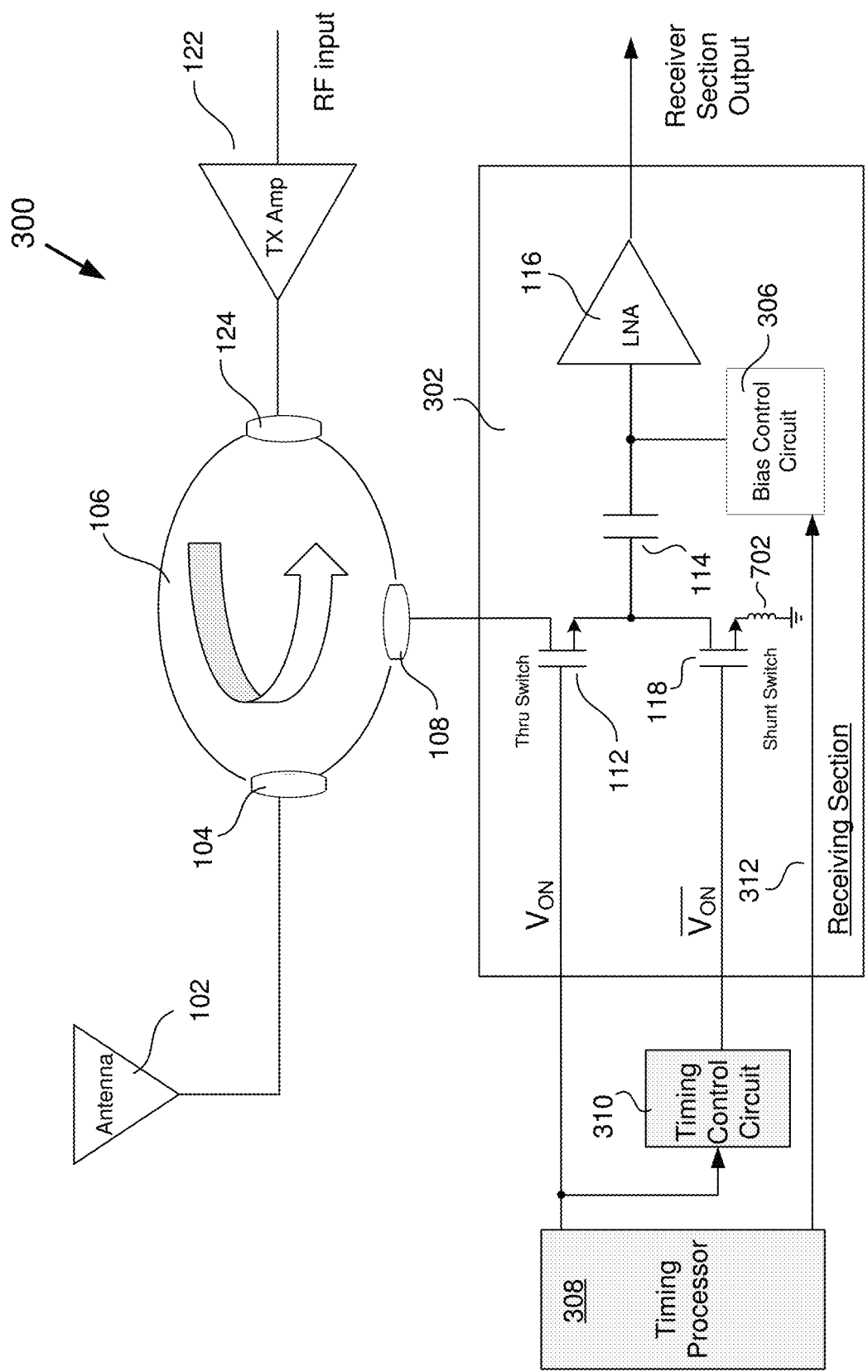
FIG. 7 is an illustration of an alternative embodiment in which an inductor is placed between the source of the shunt switch and ground.

FIG. 7 is an illustration of an alternative embodiment in which an inductor 702 is placed between the source of the shunt switch 118 and ground. The inductor 702 provides a low impedance path for the charge in the through switch to dissipate, while providing a high impedance for signals that are coupled to the receiver section 302 from the antenna 102.

Figure 8:
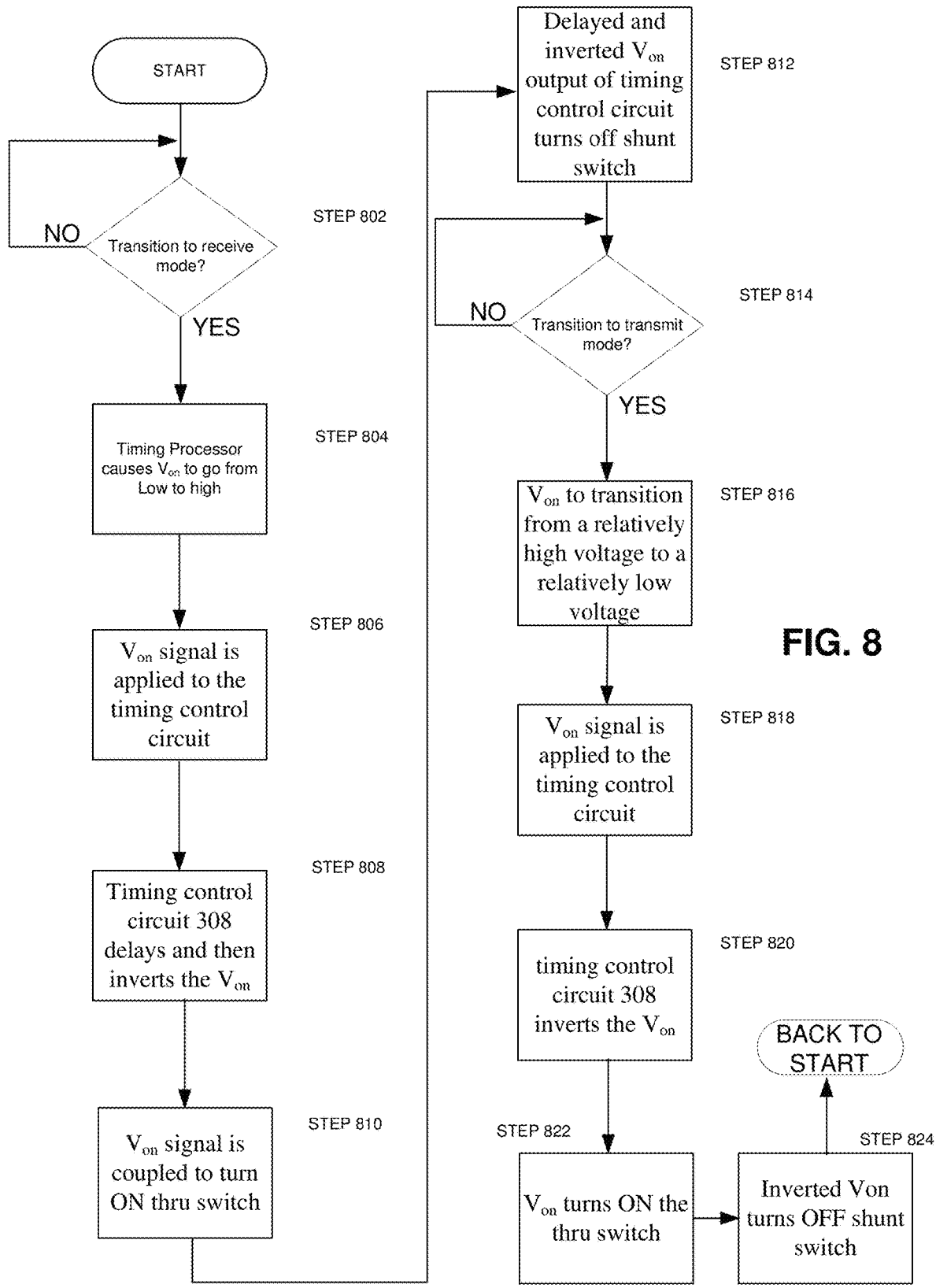
FIG. 8 is a simplified flowchart of a process in accordance with some embodiments of the disclosed method and apparatus.

FIG. 8 is a simplified flowchart of a process in accordance with some embodiments of the disclosed method and apparatus. The process starts with the transceiver 300 in transmit mode. The timing processor 308 waits for a determination that the transceiver 300 is to transition from transmit mode to receive mode (STEP 802). Upon making the determination that the transition is to occur, the timing processor 308 causes $V_{on}$ to transition from a relatively low voltage to a relatively high voltage (STEP 804). $V_{on}$ is applied to the timing control circuit 310 (STEP 806). The timing control circuit 310 delays and then inverts $V_{on}$ to generate $\overline{V_{on}}$ (STEP 808). $V_{on}$ is coupled to a control port of the through switch 112 (such as the gate of a FET, in some embodiments) and turns the through switch 112 on (STEP 810). $\overline{V_{on}}$ is coupled to a control port of the shunt switch 118 (such as a gate of a FET, in some embodiments) and turns the shunt switch 118 off a predetermined amount of time after the through switch 112 is turned on (STEP 812). In some embodiments, the predetermined amount of time is at least long enough for a sufficient amount of the charge that has accumulated in the capacitance $C_{gs}$ of the through switch 112 to discharge through the shunt switch 118 that the voltage applied to the input of the LNA 116 upon the shunt switch opening, does not damage the LNA 116. In some embodiments, the predetermined amount of time is sufficiently long that the voltage applied to the input of the LNA 116 by the bias control circuit 306 will not significantly overshoot the receive mode bias level when the shunt switch 118 opens. In some embodiments, a "significant overshoot" occurs if the voltage peaks at more than 110% of the receive mode bias level. In other embodiments, "significant overshoot" occurs if it takes more than 66% of the time required for the signal to go from a minimum voltage to a maximum voltage before settling to within 95% of the receive mode bias voltage. These parameters are provided as examples and not intended to be followed in all embodiments.

In some embodiments, the process further includes making a determination that the transceiver 300 is to transition from receive mode to transmit mode (STEP 814). The timing processor 308 waits for a determination that the transceiver 300 is to transition from receive mode to transmit mode. Upon making the determination that the transition is to occur, the timing processor 308 causes $V_{on}$ to transition from a relatively high voltage to a relatively low voltage (STEP 816). $V_{on}$ is applied to the timing control circuit 310 (STEP 818). The timing control circuit 310 inverts $V_{on}$ to generate $\overline{V_{on}}$ (STEP 820). $V_{on}$ is coupled to the control port of the through switch 112 and turns the through switch 112 on (STEP 822). $\overline{V_{on}}$ is coupled to the control port of the shunt switch 118 and turns the shunt switch 118 off (STEP 824). In some embodiments, the timing control circuit 310 generates $\overline{V_{on}}$ with a delay relative to $V_{on}$ that is equal to the propagation delay through the timing control circuit 310 with the FET 410 turned on. The process then returns to STEP 802 and may toggle between transmit and receive mode as this process continues to cycle through the steps 802 through 824.

As should be readily apparent to one of ordinary skill in the art, various embodiments of the invention can be implemented to meet a wide variety of specifications. Thus, selection of suitable component values is a matter of design choice (so long as the frequencies of interest mentioned above can be handled). The switching and passive elements may be implemented in any suitable integrated circuit (IC) technology, including but not limited to MOSFET and IGFET structures. Integrated circuit embodiments may be fabricated using any suitable substrates and processes, including but not limited to standard bulk silicon, silicon-on-insulator (SOI), silicon-on-sapphire (SOS), GaAs pHEMT, and MESFET processes. Voltage levels may be adjusted or voltage polarities reversed depending on a particular specification and/or implementing technology (e.g., NMOS, PMOS, or CMOS). Component voltage, current, and power handling capabilities may be adapted as needed, for example, by adjusting device sizes, "stacking" components to handle greater voltages, and/or using multiple components in parallel to handle greater currents.

A number of embodiments have been described. It is to be understood that various modifications may be made without departing from the spirit and scope of the claimed invention. For example, some of the steps described above may be order independent, and thus can be performed in an order different from that described. It is to be understood that the foregoing description is intended to illustrate and not to limit the scope of the invention, which is defined by the scope of the following claims, and that other embodiments are within the scope of the claims.

What is claimed is:

1. An input control circuit for a low noise amplifier, including:
   (a) a through switch configured to receive a radio frequency (RF) signal and selectively settable to pass the received RF signal to a terminal or block the received RF signal from the terminal; and
   (b) a shunt switch coupled between the terminal and circuit ground and configured to selectively suppress transient voltages at the terminal after the through switch is set to pass the received RF signal to the terminal.

2. The input control circuit of claim 1, further including an LNA having an input coupled to the terminal.

3. The input control circuit of claim 2, further including a bias control circuit having a control input and a bias output, the bias output coupled to the LNA input and the bias output providing a bias signal in response to inputs applied to the control input of the bias control circuit.

4. The input control circuit of claim 1, further including a three-port circulator having a first circulator port configured to be coupled to an antenna, a second circulator port coupled to a transmit amplifier, and a third circulator port being coupled to the through switch.

5. An input control circuit for a low noise amplifier, including:
   (a) a through switch configured to receive a radio frequency (RF) signal and selectively pass the received RF signal to a terminal in response to a first control signal; and
   (b) a shunt switch coupled between the terminal and circuit ground and configured to selectively couple the terminal to circuit ground in response to a second control signal;
   wherein the second control signal causes the shunt switch to transition from closed to open only after the first control signal causes the through switch to transition from open to closed.

6. The input control circuit of claim 5, wherein the shunt switch remains closed after the first control signal causes the through switch to transition from open to closed for an amount of time sufficiently long to suppress transient voltages at the terminal.

7. The input control circuit of claim 5, wherein the through switch includes at least one field effect transistor (FET) having a capacitance when open and wherein the shunt switch remains closed after the first control signal causes the through switch to transition from open to closed for an amount of time sufficiently long to permit a substantial amount of the charge accumulated in the through switch capacitance to discharge through the shunt switch.

8. The input control circuit of claim 5, further including an LNA having an input coupled to the terminal.

9. The input control circuit of claim 8, further including a bias control circuit having a control input and a bias output, the bias output coupled to the LNA input and the bias output providing a bias signal in response to inputs applied to the control input of the bias control circuit.

10. The input control circuit of claim 5, further including a three-port circulator having a first circulator port configured to be coupled to an antenna, a second circulator port coupled to a transmit amplifier, and a third circulator port being coupled to the through switch.

11. An input control circuit for a low noise amplifier, including:
    (a) a through switch configured to receive a radio frequency (RF) signal and selectively pass the received RF signal to a terminal;
    (b) a shunt switch coupled between the terminal and circuit ground and configured to selectively couple the terminal to circuit ground; and
    (c) a timing control circuit coupled to the shunt switch and configured to transition the shunt switch from a closed state to an open state only after the through switch transitions from an open state to a closed state.

12. The input control circuit of claim 11, wherein the shunt switch remains closed after the through switch transitions from an open state to a closed state for an amount of time sufficiently long to suppress transient voltages at the terminal.

13. The input control circuit of claim 11, wherein the through switch includes at least one field effect transistor (FET) having a capacitance when open and wherein the shunt switch remains closed after the through switch transitions from an open state to a closed state for an amount of time sufficiently long to permit a substantial amount of the charge accumulated in the through switch capacitance to discharge through the shunt switch.

14. The input control circuit of claim 11, further including an LNA having an input coupled to the terminal.

15. The input control circuit of claim 14, further including a bias control circuit having a control input and a bias output, the bias output coupled to the LNA input and the bias output providing a bias signal in response to inputs applied to the control input of the bias control circuit.

16. The input control circuit of claim 11, further including a three-port circulator having a first circulator port configured to be coupled to an antenna, a second circulator port coupled to a transmit amplifier, and a third circulator port being coupled to the through switch.

* * * * *